UNITED STATES PATENT OFFICE.

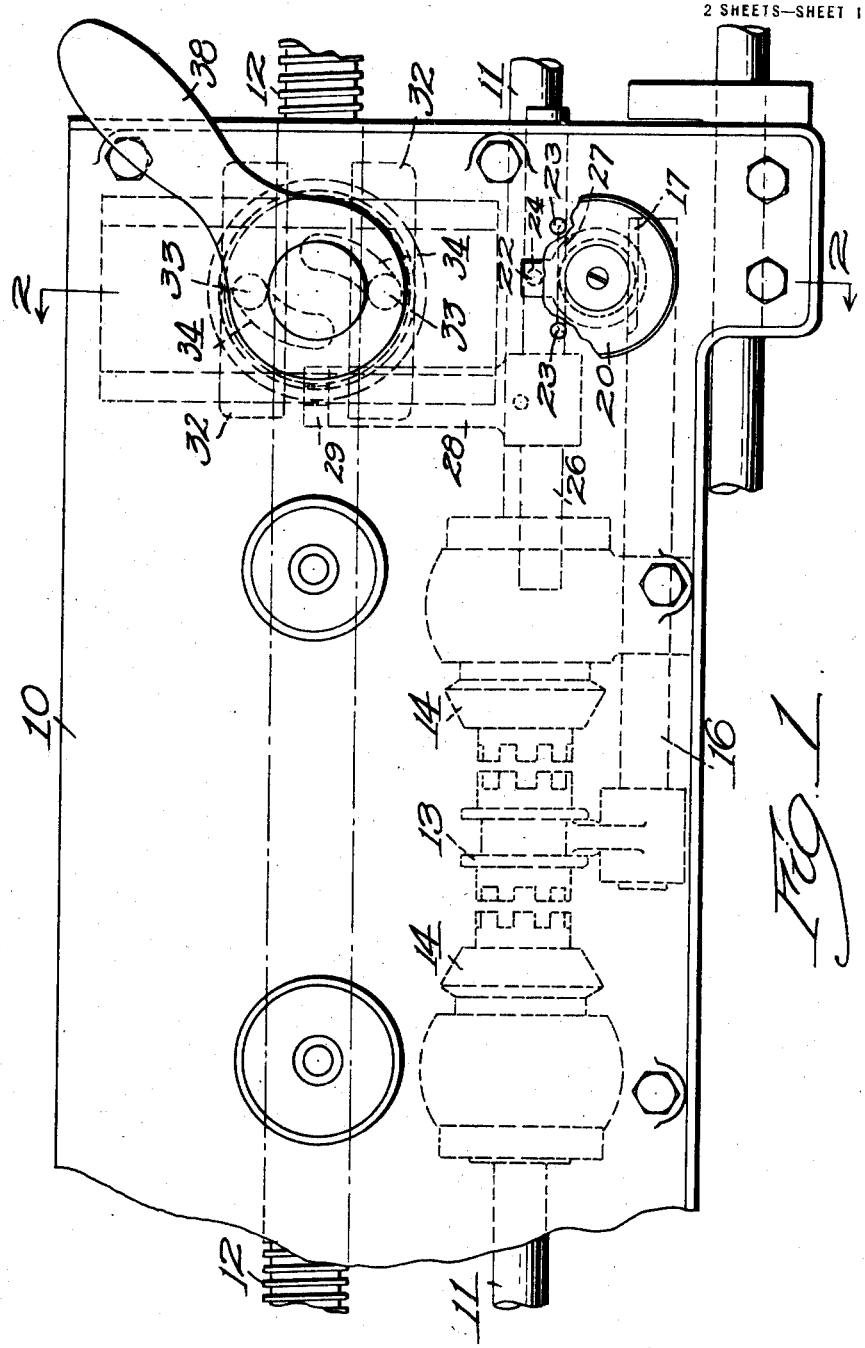

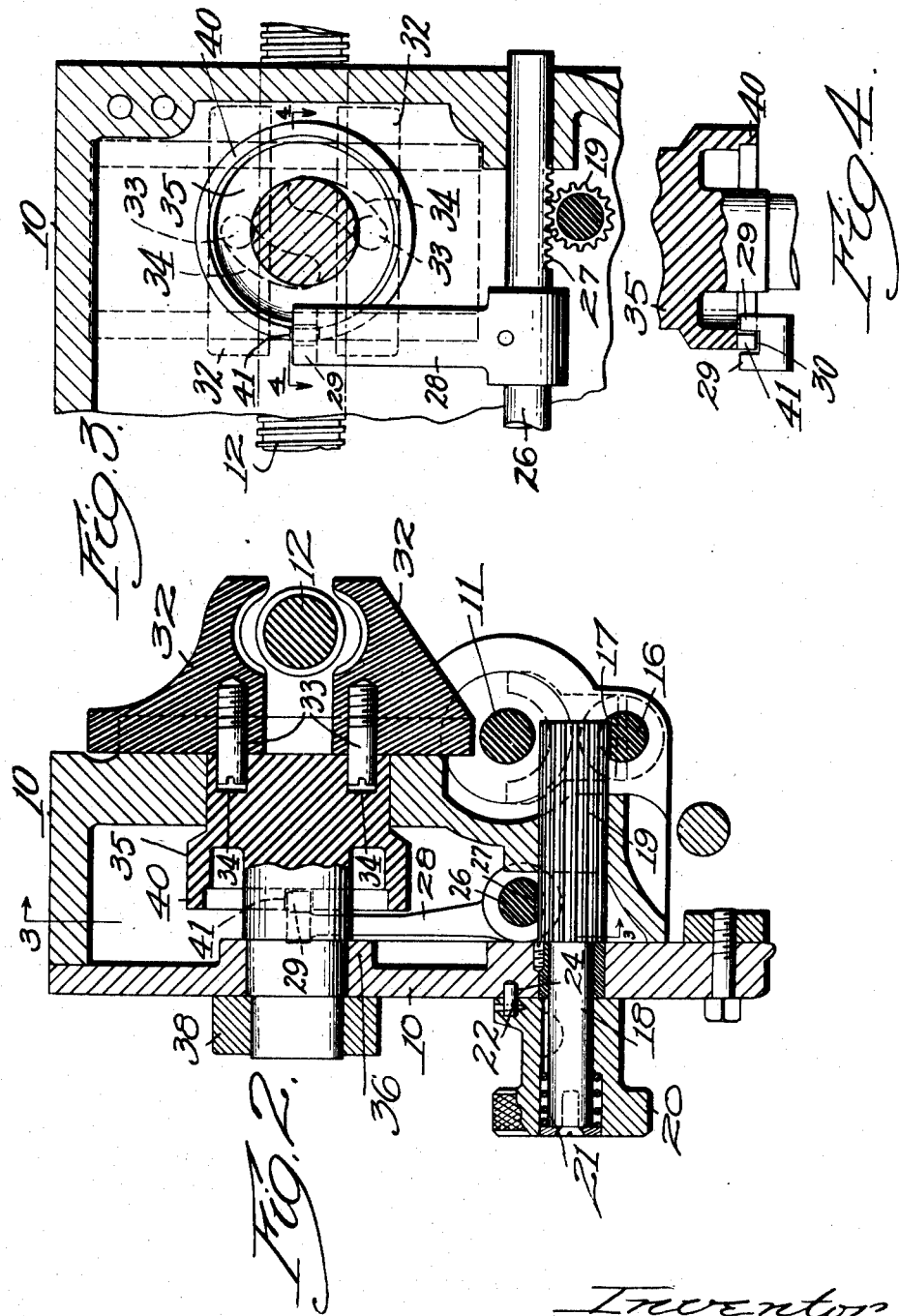

FRED K. HENDRICKSON, OF WORCESTER, MASSACHUSETTS, ASSIGNOR TO REED-PRENTICE COMPANY, OF WORCESTER, MASSACHUSETTS, A CORPORATION OF MASSACHUSETTS.

OPEN AND SHUT NUT LOCKING DEVICE.

1,365,827.     Specification of Letters Patent.   Patented Jan. 18, 1921.

Application filed November 7, 1919. Serial No. 336,422.

*To all whom it may concern:*

Be it known that I, FRED K. HENDRICKSON, a citizen of the United States, residing at Worcester, in the county of Worcester and State of Massachusetts, have invented a new and useful Open and Shut Nut Locking Device, of which the following is a specification.

This invention relates to an improved mechanism for so connecting the open and shut nuts, that coöperate with the lead-screw of an engine lathe, to the mechanism for actuating the clutch that controls the direction of rotation of the feed rod that the half nuts cannot be closed except when the feed rod clutches are in neutral position and the feed rod clutches cannot be thrown in to drive the feed rod in either direction when the half nuts are closed together so as to cause the lead-screw to drive the carriage.

Machines have been made heretofore for this general purpose, and the principal object of this invention is to provide a simple and absolutely accurate mechanism for this purpose which cannot fail to perform both of the above mentioned functions and which will add very little to the expense of a lathe apron not provided with such a device and not increase its size.

Further objects and advantages of the invention will appear hereinafter.

Reference is to be had to the accompanying drawings in which—

Figure 1 is a front elevation of a part of an engine lathe carriage apron with a preferred embodiment of this invention applied thereto;

Fig. 2 is a sectional view of the same on the line 2—2 of Fig. 1;

Fig. 3 is a sectional view on the line 3—3 of Fig. 2; and

Fig. 4 is a sectional view on the line 4—4 of Fig. 3.

I have shown the invention as applied to a well known type of engine lathe carriage having an apron 10 through which run the lead screw 12 and feed rod 11 having the usual functions. The feed rod is as usual shown as connected in forward or reverse direction by means of a double clutch 13 with the bevel gears 14 which in the well-known way mesh with a larger bevel gear. This clutch is operated by a clutch actuating rod 16.

In order to actuate this rod I provide it on its surface with a rack 17, and on a push and pull rod 18 which extends through the front of the carriage I provide a long gear 19 meshing with this rack. This rod 18 is provided with a knurled operating head 20 on the front of the apron slidingly splined to the rod. Its motion outward is yieldingly resisted by a spring 21. This head is provided with a pin 22 adapted to enter either of a pair of depressions 23 in the face of the carriage and as will be understood readily it is pulled out and turned to a position in which the pin 22 enters either one of these depressions to throw in the feed in either forward or reverse direction. There is a third depression 24 into which the pin is placed when the clutch is in neutral position as shown.

Adjacent to this long gear 19 I place another sliding rod 26 having a rack 27 on the bottom meshing with the gear 19. In the present form I have shown the racks 17 and 27 on opposite sides of the gear so that they move in opposite directions.

On the rod 26 is fixed a locking element 28. This has a double projection 29 provided with a notch 30 in the center, the projection extending out at right angles to the direction of sliding motion of the rod and locking element.

For the purpose of operating the half nuts 32 which coöperate with the lead screw I provide each of these nuts with a stud 33. These studs project into cam slots 34 in an oscillatory member 35 mounted between the lead screw and a bearing at 36 on the apron. This oscillatory element is provided with a handle 38 on the front of the apron which operates it. The method of operation to open and close the vertically sliding half nuts will be obvious.

This oscillatory member is provided with a circular flange 40 which, when the clutches 13 are in neutral position and the oscillatory member 35 is in position to close the half nuts 32, will pass through the notch 30 and thus hold the locking element 28 against motion in either direction, and thus prevent the throwing in of either of the clutches 13. When, however, the half nuts 32 are open as shown in the drawings in full lines, the flange 40 is in such position that a passage 41 extending through it registers with the projection 29 and therefore allows the clutches to be opened or closed.

It is to be understood that in the position shown in the drawings the notch 30 registers with this flange 40 so that in that position any desired motion can take place, that is, the half nuts can be closed or the clutches can be thrown. However, only one of these operations can take place because if the half nuts are closed by the oscillation of the member 35 the notch 41 moves out of registration with the projection 29 and as stated above, this locking member 28 cannot be moved in either direction.

Furthermore, if starting with the parts open the clutch 13 is thrown in either direction, one of the two projections 29 on opposite ends of the notch 30 will move either in or out as the case may be through the passage 41 and stop inside that passage. This prevents the oscillation of the member 35 and the closing of the half nuts 32. Therefore the two functions first above mentioned are secured in a positive and simple manner without resorting to external locking means on the feed rod or any complicated mechanism tending to enlarge the apron or render it materially more expensive.

Although I have illustrated and described only a single form of the invention I am aware of the fact that modifications can be made therein and that it can be changed to suit it for other types of lathes from that one shown without departing from the scope of the invention as expressed in the claims.

Therefore I do not wish to be limited to all the details of construction or to the particular type of lathe apron herein shown and described, but what I do claim is:—

1. In a lathe, means to prevent the simultaneous closing of the lead screw half nuts and the engagement of the feed rod clutches, comprising a member slidable with the clutch rod and having a lateral arm provided with a pair of locking projections, and an oscillatable nut actuator provided with a flange adapted to pass between said projections in one position of said arm, said flange having a notch to receive one or the other of said projections in the other position of said arm.

2. In a lathe, the combination with the lead screw and feed rod and separate means on the carriage to connect it to said screw and rod, of means to prevent its connection to both simultaneously, comprising an oscillatory member to connect it to the screw and provided with a locking flange, and a slidable member to connect it to the rod and provided with an arm having locking projections, said flange passing between said projections and having a notch to receive the same.

3. In a lathe, the combination with the lead screw and feed rod, oscillatable means on the carriage to connect it with the former and slidable means on the carriage to connect it with the rod, of a slidable locking member operated at the same time as said slidable means but in the opposite direction, a flange on said oscillatable means having a notch at one place, and an arm carried by said slidable member and having two locking projections separated by a notch to receive said flange, whereby in one position of said member the oscillatable means cannot be turned and in the other position of said member the slidable means cannot be moved.

4. In a mechanism of the class described, a geared feed rod actuator, a toothed rod in mesh with said gear and carrying an arm provided with locking projections separated by a notch, and an oscillatable lead screw nut actuator having a flange engaging in said notch and also having a notch to engage said projections.

5. A lathe apron mechanism, comprising half nuts for engagement with the lead screw and clutches for engagement with the feed rod, independent manually operable means for actuating said nuts and clutches, the means for actuating the nuts comprising an oscillatable member provided with a locking flange notched in one place, and the means for actuating the clutches comprising a rack rod and gear, and a locking member comprising a rack rod also in mesh with said gear and an arm on said rod carrying projections on its end fitting over said flange, said projections adapted to occupy the notch in the flange when the half nuts are in engagement and said flange adapted to pass between said projections when one of said clutches is in engagement.

6. In an engine lathe, the combination with the open and shut half nuts for the lead screw and the clutches for connecting the feed rod with the power, of a member for opening and closing the half nuts, a clutch actuator adapted to turn, and an element connected with said actuator to be operated thereby having a sliding motion and provided with a rack, said clutch actuator having a gear meshing with said rack, said element having a notched projection, and said opening and closing member having a flange adapted to pass through said notch when they register.

7. In an engine lathe, the combination with the open and shut half nuts for the lead screw, the clutches for connecting the feed rod with the power, and a clutch rod therefor, of an oscillatory member for opening and closing the half nuts, an oscillatable clutch rod actuator, a locking element connected with said actuator to be operated thereby having a sliding motion and provided with a rack, said clutch rod actuator having a gear meshing with said rack for operating it, said locking element having a notched projection, said oscillatory member being provided with an arcuate flange in position to be prevented from moving by said projection and to prevent motion of said projection but adapted to pass through said notch when they register, and said flange having a notch through which said projection is adapted to pass when they register.

In testimony whereof I have hereunto affixed my signature.

FRED K. HENDRICKSON.